March 15, 1938.  K. CLARK  2,111,312

CUP

Filed Nov. 11, 1936

INVENTOR.
KENDALL CLARK
BY
ATTORNEY.

Patented Mar. 15, 1938

2,111,312

UNITED STATES PATENT OFFICE 2,111,312

CUP

Kendall Clark, South Bend, Ind., assignor to Bendix Products Corporation, South Bend, Ind., a corporation of Indiana Application November 11, 1936, Serial No. 110,208

10 Claims. (Cl. 309—33)

This invention relates to hydraulic brake systems, and more particularly to sealing means therefor.

An object of the invention is to provide sealing means for the moving parts of a hydraulic brake system which may compensate for wear of the parts and may retain its full effectiveness over a long period of use.

Another object of the invention is to provide means for effectively sealing the reciprocating parts of a fluid pressure braking system irrespective of the direction of movement of the parts.

Another object of the invention is to provide a fluid pressure braking system having a cylinder opened at one end to the atmosphere and a piston reciprocable in the cylinder provided with a sealing means inhibiting the seepage of fluid from the cylinder past the piston and the leakage of air into the system.

Other objects will appear from the following description taken in connection with the drawing forming a part of this specification, and in which,—

Figure 1:
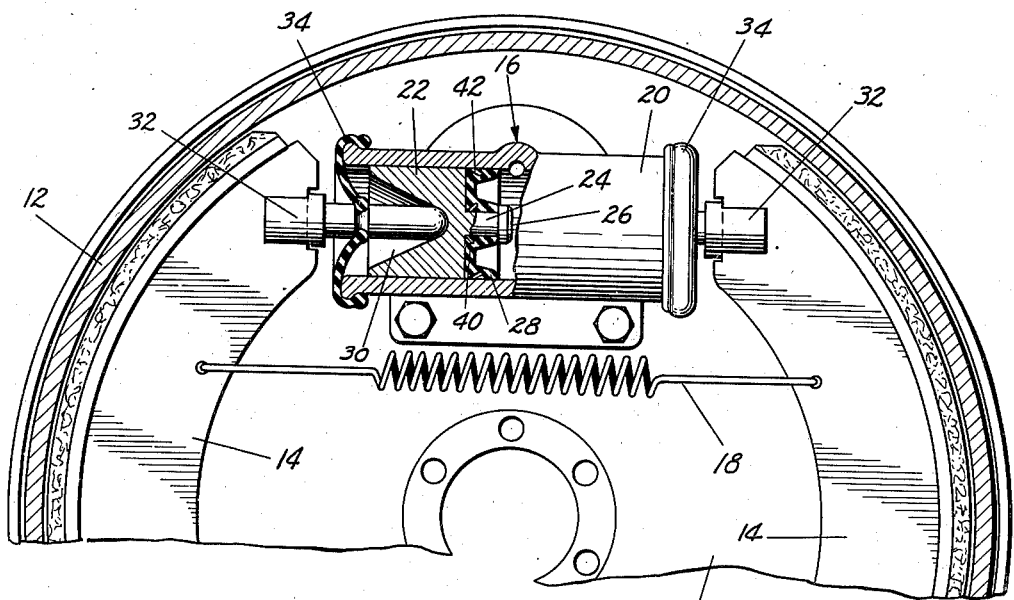
Fig. 1 is a vertical, sectional view of a brake, partly broken away, illustrating the invention as applied.
Figure 2:
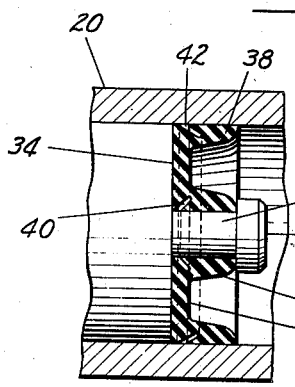
Fig. 2 is an enlarged fragmentary view of a cylinder and a piston reciprocable in the cylinder having on its head a leak-proof cup embodying the invention.

Referring to the drawing for more specific details of the invention, 10 represents a fixed support or backing plate having associated therewith a rotatable drum 12. A pair of corresponding interchangeable friction elements or shoes 14 are arranged on the backing plate for cooperation with the drum, and an actuator 16 mounted on the backing plate between the shoes is operative to move the shoes into engagement with the braking surface of the drum against the resistance of a retractile spring 18 connecting the shoes.

The actuator includes a cylinder 20 open at both ends and adapted to be connected to a fluid pressure producing device of any preferred type. The cylinder has therein oppositely disposed reciprocable pistons 22, only one of which is shown. These pistons have on their heads concentric extensions 24 provided with knobs 26 on their free ends.

Leak-proof cups 28 seated on the heads of the pistons embrace the extensions and knobs and are retained against displacement thereby. In the backs of the pistons are recesses 30 for the reception of thrust pins 32 connected respectively to the friction elements 14, and sleeved on the pins are shields 34 embracing the open ends of the cylinder for the exclusion of dust and other foreign substances from the cylinder.

As shown, the cup 28 includes an annular base 34 having inner and outer marginal flanges 36 and 38 provided with circumferential grooves 40 and 42 arranged adjacent the base and inclined upwardly toward one another. The cup is seated on the head of the piston. The inner flange 38 of the cup embraces the extension 24, and the rim of this flange is seated beneath the knob 26 so as to retain the cup against displacement.

When fluid under pressure is introduced into the cylinder 20, the pressure on the fluid is imposed on the cup, and this results in moving the piston on its compression stroke. When the pressure is received by the cup, the grooves 40 and 42 are closed and the cup functions in the usual maner. Thus the flanges of the cup are pressed against the wall of the cylinder and the extension on the head of the piston to effectively seal the piston so as to inhibit the seepage of fluid from the cylinder past the piston.

Upon release of the pressure on the fluid in the cylinder, the piston is returned to its retracted position under the influence of the retractile spring 18 connecting the shoes. During this movement the grooves 40 and 42 open to the condition shown. During the return stroke of the piston a partial vacuum may be created in the cylinder. Under this condition air would normally be drawn into the system from the open end of the cylinder past the piston. In the instant invention this is inhibited by the provision of the circumferentially inclined grooves 40 and 42 in the flanges of the cup which materially enhance the value of the cup to the extent that the flanges may more effectively cooperate with the wall of the cylinder and the concentric extension on the piston to exclude the passage of air. Under such a condition the forward flange to the cup might tend to move radially in toward the axis of cylinder 20 due to the vacuum inside the cylinder. As the cup is made of a resilient flexible material, the lip of the cup will tend to rock with the thin section of the lip at the bottom of the groove 42 as a pivot. This rocking motion will cause the lip of the groove to move outward against the cylinder wall and aid to seal more effectively against the drawing in of air. The difference in air pressure between the atmospheric pressure outside the cylinder and in the groove 42 and the partial vacuum in the cylinder 20 also tends to force the lip of the groove 42 against the cylinder wall and will also aid in forcing the groove lip into sealing contact.

Figure 3:
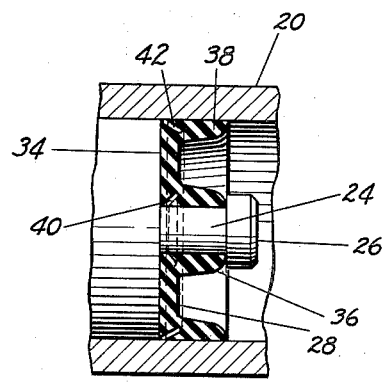
Fig. 3 is a similar view illustrating a modification of the cup.

A modification of the invention is illustrated in Fig. 3. In this modification the inclined grooves 40 and 42 are arranged to check the ingress of air between the piston and the wall of the cylinder. As shown, the marginal flanges 36 and 38 form, with the base 34, angles at the junction of the flanges and the base, and the grooves 40 and 42 extending from these angles upwardly and inwardly toward one another.

Figure 4:
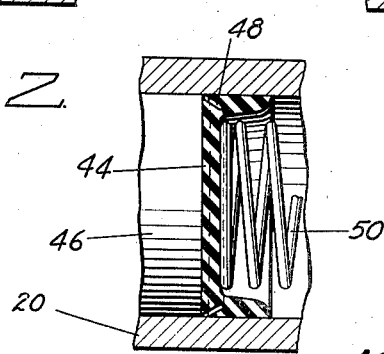
Fig. 4 is another similar view illustrating a modification of the cup.

Another modification of the invention is shown in Fig. 4, wherein a conventional leak-proof cup 44 carried on the head of a piston 46 is provided with a circumferential inclined groove 48 corresponding to the grooves 42 in the preferred embodiment of the invention. In this instance the cup is retained against displacement by a spring 50.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A flexible sealing cup having a circumferential groove in its outer surface, the groove being formed with inclined walls defining a sharp edge opposed to the normal sealing direction of the cup.

2. A flexible sealing cup having a base and a marginal flange and a circumferential groove in the marginal flange adjacent its base, the groove being formed with inclined walls defining a sharp edge opposed to the normal sealing direction of the cup.

3. A flexible cup having a base, a marginal flange and a circumferential inclined groove, the walls defining the groove extending from the base of the cup into the flange and forming acute angles with each.

4. A flexible sealing cup having an annular base, and inner and outer marginal flanges each provided with circumferential grooves, the grooves being formed with inclined walls defining a sharp edge opposed to the normal sealing direction of the cup.

5. A flexible cup comprising an annular base supporting inner and outer marginal flanges provided with circumferential grooves inclined from the base upwardly and inwardly toward one another.

6. A flexible cup comprising a base having a marginal flange forming with the base an angle at the junction of the flange and the base, said cup having a groove the walls of which are inclined upwardly from the angle.

7. A flexible cup comprising an annular base having inner and outer marginal flanges forming with the base angles at the junctions of the flanges and the base, said cup having grooves the walls of which are extending from the angles inwardly and upwardly toward one another.

8. In a fluid pressure actuated motor, a cylinder, a piston reciprocable therein, and a flexible cup on the head of the piston having a base and a marginal flange and a circumferential groove inclined upwardly and inwardly from the base.

9. In a fluid pressure actuated motor, a cylinder, a piston reciprocable in the cylinder having a concentric extension provided with a knob on its free end, a flexible cup seated on the piston embracing the extension and the knob comprising an annular base having inner and outer marginal flanges provided with circumferential grooves inclined from the base upwardly and inwardly toward one another.

10. A rubber cup having a base and a marginal flange formed with a circumferential groove in its outer surface defining between the surface of the marginal flange and the surface of the groove an acute angular edge directed toward the base of the cup.

KENDALL CLARK.